UNITED STATES PATENT OFFICE.

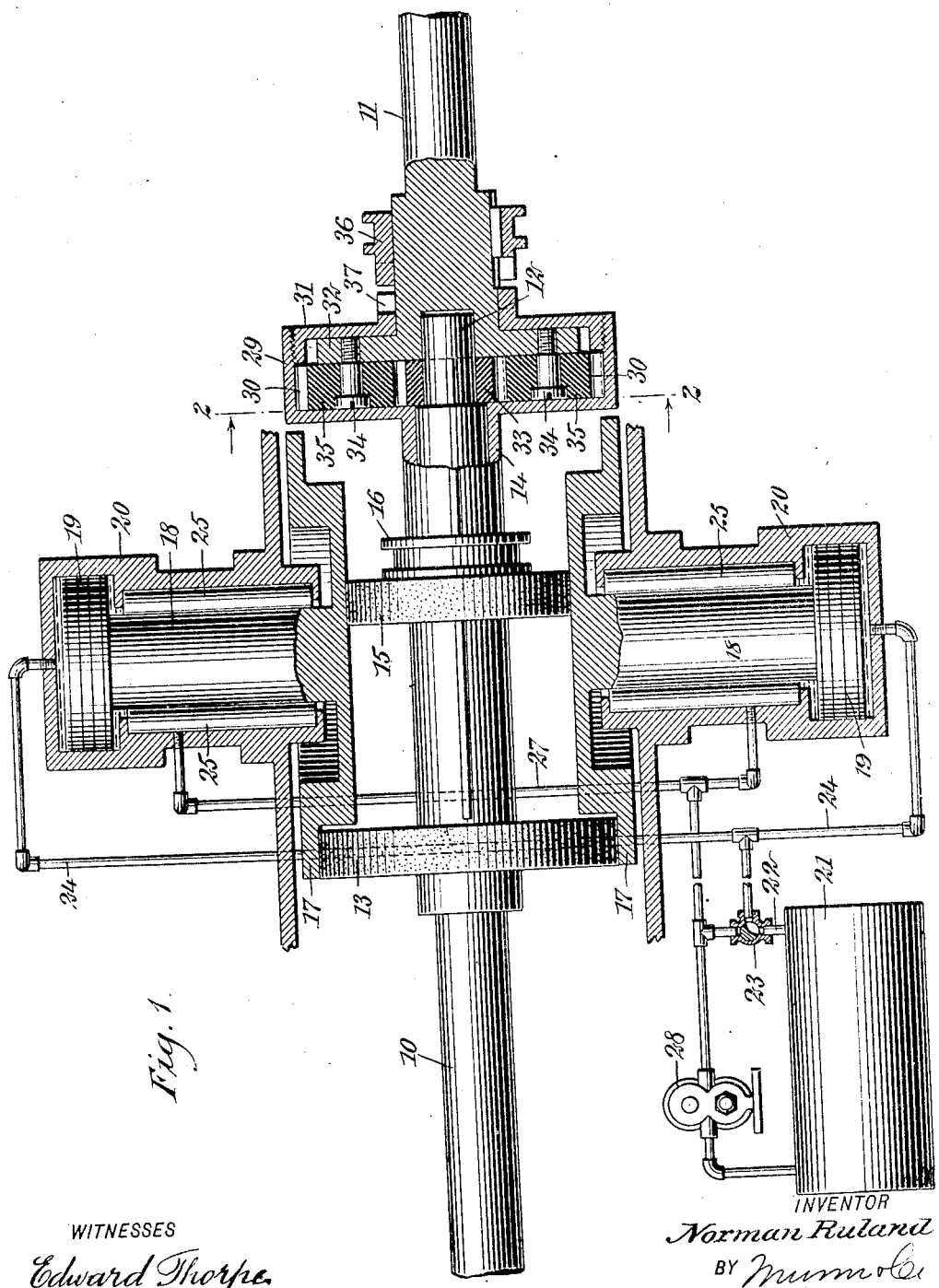

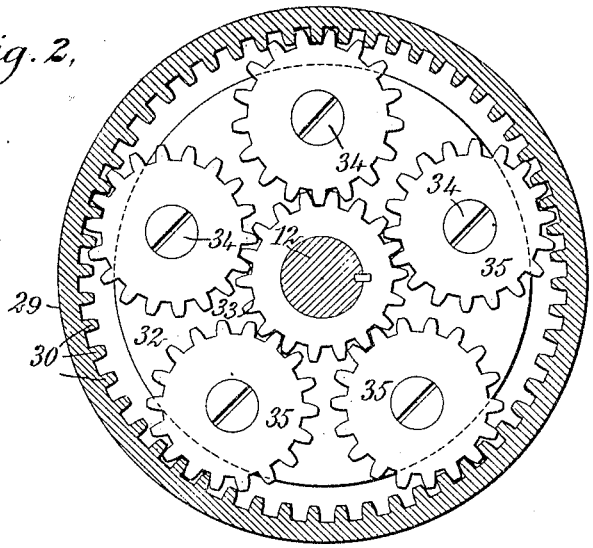
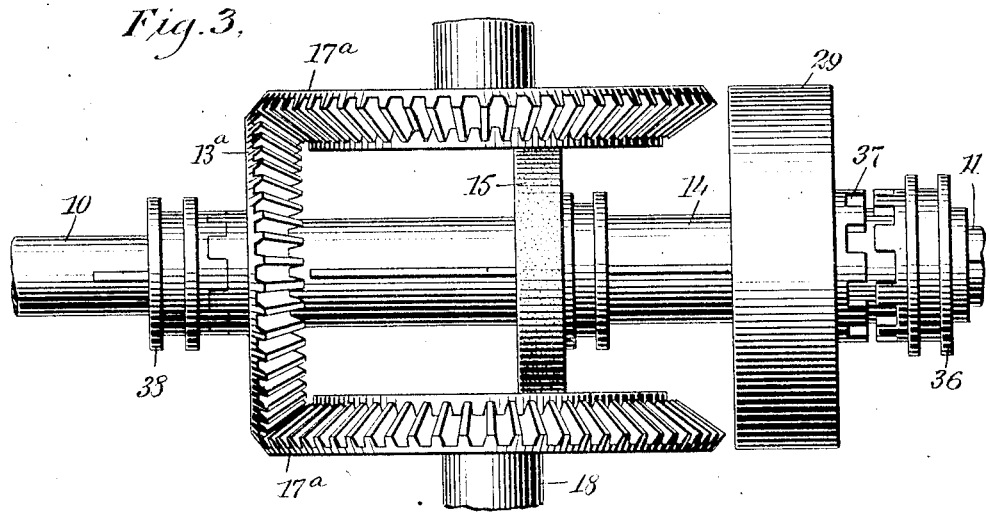
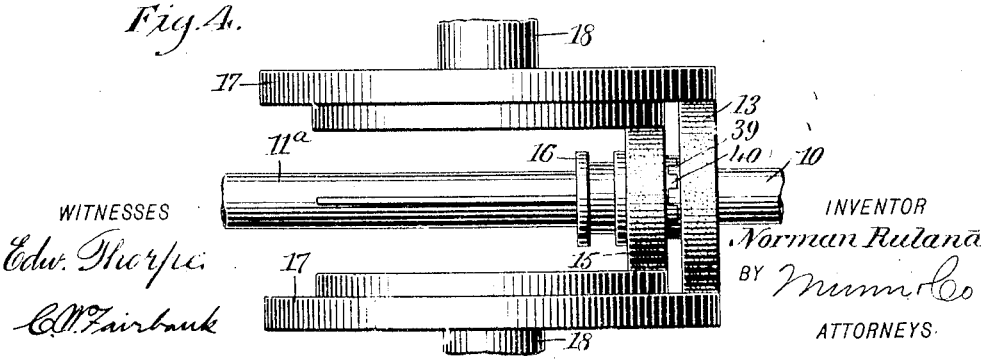

NORMAN RULAND, OF NEW YORK, N. Y.

POWER-TRANSMISSION MECHANISM.

No. 888,265.   Specification of Letters Patent.   Patented May 19, 1908.

Application filed July 20, 1907. Serial No. 384,711.

*To all whom it may concern:*

Be it known that I, NORMAN RULAND, a citizen of the United States, and a resident of the city of New York, borough of Brooklyn, in the county of Kings and State of New York, have invented a new and Improved Power - Transmitting Mechanism, of which the following is a full, clear, and exact description.

This invention relates to certain improvements in mechanism for transmitting power from a driving member to a driven member and for varying the speed and direction of rotation of said driven member.

My improved mechanism includes one or more idlers in frictional or geared connection to a driving wheel and a driven wheel, the idler being held in proper position by fluid pressure, and one of the wheels being movable in respect to the other to vary its point of engagement with the idler, whereby the speed of the driven wheel may be varied.

The invention also includes a gearing similar to a planetary transmission gearing, but operating to rotate the driven shaft at a speed and in a direction directly dependent upon the difference in the speeds of rotation of two separate parts of the driving mechanism and the direction of rotation of one of them.

In my improved mechanism I can rotate the driven shaft in the same direction and at the same speed as the driving shaft, the two being locked together, or the driven shaft may be rotated at any speed whatsoever from that of the driving shaft down to zero and then through an equivalent range in the opposite direction. I am also able to entirely disconnect the idlers from operation when the driving and driven shafts are locked together, thus reducing friction and needless expenditure of energy.

The invention consists in certain features of construction and combinations of parts, all of which will be fully set forth hereinafter and particularly pointed out in the claims.

Reference is to be had to the accompanying drawings, forming a part of this specification, in which similar characters of reference indicate corresponding parts in all the figures, and in which Figure 1 is a longitudinal section through a mechanism constructed in accordance with my invention, a portion thereof being shown in side elevation; Fig. 2 is a transverse section on the line 2—2 of Fig. 1; Fig. 3 is a side elevation of a mechanism involving a different means of transmitting motion to the idlers and illustrating a different clutch; and Fig. 4 is a side elevation of a third form in which the planetary gearing is eliminated.

My improved mechanism is adapted for transmitting motion from one driving element to another, and is reversible, whereby either of the elements may be employed as the driving element and the other employed as the driven element. For simplicity and clearness in the description and drawings, I have illustrated the two elements as shafts 10 and 11 and will hereinafter refer to the shaft 10 as the "drive shaft" and the shaft 11 as the "driven shaft," although in operation they may, if desired, be reversed. The drive shaft 10 and the driven shaft 11 are illustrated in Figs. 1 and 2 as being in alinement, and the shaft 10 having a reduced end portion 12 fitting in a recess in the enlarged end of the shaft 11. Keyed or otherwise rigidly secured to the drive shaft 10 is a friction wheel 13 at a short distance from the end of the shaft, and between this friction wheel and the end of the shaft there is provided a sleeve 14 rotatable in respect to the shaft. Slidably mounted upon the sleeve or keyed to prevent the rotation thereof in respect to said sleeve, is a second friction wheel 15, preferably somewhat smaller than the friction wheel 13 but having a common axis of rotation. The friction wheel 15 carries a grooved collar 16 adapted for engagement with a yoke lever or any other suitable mechanism, whereby said wheel may be moved longitudinally along the sleeve. Disposed adjacent the two friction wheels and preferably rotatable on an axis at right angles to the axis of rotation of the drive and driven shafts, there is provided one or more idlers 17, normally in engagement with the two friction wheels. Both of the friction wheels preferably have cylindrical outer surfaces at right angles to the axis of rotation, and both engage with the face of the idler. The range of movement of the friction wheel 15 permits of the same being brought closely adjacent the wheel 13 or moved to a position a short distance from the axis of rotation of the idler upon the opposite side.

In order that the friction wheel 15 may be caused to rotate at the same speed as the friction wheel 13, a portion of the surface of the idler adjacent the circumference thereof, lies in a different plane than the remaining portion of the surface, and the wheels 13 and 15 differ in radius an equal amount. This difference in radius of the wheels and the distance between the two planes of the idler, is such that the medial lines of engagement of the two wheels with the idler may be intersected by a line passing through the intersection of the respective axis of rotation of the wheels and the idler. In this manner, I am able to secure the simultaneous rotation of the sleeve 14 and the shaft 10 at exactly the same speed and in the same direction when desired. Any desired number of idlers may be employed, but in the drawings I have illustrated two engaging with the friction wheels upon diametrically opposite points so that the thrust on the shafts 10 and 11 produced by one idler will be neutralized by the other idler. In order to reduce friction, to afford a convenient means of throwing the various parts into or out of engagement and in order that the idlers may engage with the friction wheels at a uniform pressure, and whereby any inequalities or irregularities in the surfaces of the wheels or the idlers may be compensated for to produce a uniform running, I preferably hold the idlers in position by fluid pressure, as illustrated in Fig. 1. Each is provided with a spindle 18 upon which said idler rotates, and the outer end of each spindle is provided with a piston 19 so constructed that fluid pressure may be applied to the outer surface thereof to force the idler into engagement with the friction wheels.

As illustrated, I provide a suitable casing 20 for each idler, said casing inclosing the spindle and forming a cylinder at its outer end for the reception of the piston. For supplying the pressure, I provide a tank 21 having a conduit 22 leading therefrom and provided with a three-way valve 23 through which the fluid, preferably oil, may pass to the conduits 24 leading to the ends of the cylinders. The oil in the tank 21 is preferably under pressure, and as the valve 23 is turned to the position illustrated in the drawings, the oil flows through the conduits to force the idlers into position. The oil slowly escapes past the pistons and into the chamber surrounding the spindles. Within this chamber are preferably provided a plurality of anti-friction rollers 25 for holding the spindles in position, and the oil serves to lubricate these rollers. From adjacent the rollers the oil is returned through a suitable conduit 27 to the tank, there being a small pump provided for this purpose, as, for instance, a gear pump 28. The return conduit 27 communicates with the valve 23, whereby when it is desired to remove the idlers from engagement with the friction wheels, the valve may be turned to place this conduit in communication with the conduit 27, and the oil can no longer flow to the outer ends of the cylinders.

The sleeve 14 may be directly connected to the driven shaft 11, or the sleeve may be omitted and the wheel 15 keyed directly to the driven shaft, as illustrated in Fig. 4, but to permit of the transmission of greater power by the distribution of the strain and to obtain a greater range of speed I preferably insert a gearing for transmitting motion to the shaft 11 not only from the sleeve 14, but also from the shaft 10, independent of the friction wheels. The gearing employed resembles somewhat that commonly known as a "planetary gearing," and is preferably constructed as illustrated. The sleeve 14 is formed integral with a casing 29 having gear teeth 30 upon the inner surface thereof and having its outer end closed by a plate 31 threaded or otherwise rigidly secured to said casing. The shaft 11 terminates in a plate 32 within the casing and preferably lying adjacent the closure plate 31. The reduced end 12 of the drive shaft 10 extends into the casing, and keyed to this reduced end is a pinion 33 having outwardly-directed teeth oppositely disposed to the inwardly-directed teeth 30 of the casing. The plate 32 of the driven shaft is provided with one or more outwardly-extending studs 34, each bearing a pinion 35, and each of these pinions engages not only with the pinion 33 of the drive shaft, but also with the gear teeth 30 of the casing.

In the operation of the device illustrated in Fig. 1, power is applied to the shaft 10 from any suitable source, and the friction wheel on this shaft serves to operate the idlers or disks 17. The friction wheel 15 is rotated from the idlers, and when the two wheels are closely adjacent each other the sleeve 14 and the shaft 10 are caused to rotate in the same direction at the same speed. The pinion 33 is now completing one revolution in exactly the same time as is the casing 29, and the pinions 35 are therefore carried around the pinion 33 but prevented from rotating on their axes. This bodily movement of the pinion causes a rotation of the driven shaft 11, which shaft, it will be noted, will rotate at exactly the same speed as the drive shaft. The shaft 11 is preferably provided with a toothed clutch 36 keyed thereto and slidable to engage with teeth 37 on the plate 31 of the casing 29. When the shafts are rotated at the same speed, this clutch may be readily thrown into operation and then the valve 23 may be turned and the idlers no longer held in engagement with the friction wheels. When it is desired to rotate the driven shaft from the drive shaft at a different speed or in a different direction, or to hold the same from rotating, the friction wheel 15 is moved along the sleeve to the proper point. As the wheel 15 is moved away from the wheel 13, the sleeve 14 is caused to rotate slower than the drive shaft 10, and the resulting difference in the rates of rotation of the pinion 33 and the casing 29 causes the pinions 35 to rotate in the opposite direction on their axes and thus retard the rotation of the driven shaft.

When the friction wheel 15 reaches approximately the location at which it is shown in Fig. 1, it is rotated in the reverse direction from the friction wheel 13 and the pinion 35 and casing are rotated in opposite directions but at different speeds. When the relative speeds of the two are in inverse ratio to the numbers of the teeth on the pinion 33 and the casing 29, the outer sides of the pinions 35 will be moved as rapidly in one direction as are the inner sides of the pinions moved in the opposite direction. This permits the pinions to rotate on their axes and permits the shaft 11 to stand still independent of the speed of rotation of the shaft 10. As the friction wheel 15 is moved farther toward the right-hand side of Fig. 1, the difference in the speeds of rotation of the pinion 33 and casing 29 increases, and the shaft 11 is caused to rotate in the reverse direction. Thus, it is evident that with the shaft 10 rotating at constant speed, the shaft 11 may be rotated at the same speed and in the same direction, or at any lesser speed whatsoever down to the point at which the shaft 11 stands still. By further movement of the friction wheel 15 in the same direction, the shaft 11 may be caused to rotate in the reverse direction from the shaft 10 and at any speed from zero up to a predetermined limit, dependent upon the relative sizes of the parts employed. In changing from one speed to another, there is not the slightest jar, as the change is gradual and covers every speed from the highest to the lowest in succession. The idlers may be withdrawn from operation when the two shafts are rotated at the same speed, thus reducing the friction and reducing the loss of energy resulting therefrom.

In order that the idlers may be more positively and definitely rotated from the wheel 13 and all loss due to slipping eliminated, I may, if desired, form the wheel 13 as a bevel gear wheel 13ª, as illustrated in Fig. 3, and form the idlers with flat faces for the engagement with the friction wheel 15 but having a bevel gear rim 17ª adjacent the circumference thereof for engagement with the bevel gear wheel 13ª.

In Fig. 3, the planetary gearing is not illustrated in detail, as the same gearing as is shown in Fig. 1 may be employed.

In order to permit the pinion 13ª and idlers 17ª to remain stationary after the clutch 36 has been thrown in and positively stopping the device in case of emergency, the friction drive wheel 13 or the gear wheel 13ª, may be secured to the shaft by a clutch rather than by a key or set screw.

In Fig. 3 I have illustrated a clutch collar 38 keyed to the shaft 10 and normally in engagement with the drive gear wheel 13ª to rotate the latter, but capable of longitudinal movement out of engagement with this drive wheel to stop the latter in emergency. If desired, the drive shaft 10 may terminate adjacent the drive wheel 13 and the driven shaft 11 may extend into close proximity to said drive wheel.

In Fig. 4 I have illustrated such a drive shaft 11ª, and in this form the planetary gearing is entirely eliminated and the driven friction wheel 15 and its collar 16 are keyed directly to the driven shaft. The equivalent of the clutch collar 36 and teeth 37 is supplied in the form of co-acting clutch teeth 39 and 40 upon the friction drive wheel 13 and the friction driven wheel 15. As these two wheels are brought closely adjacent each other to rotate the two shafts at the same speed, the clutch teeth of one engage with the clutch teeth of the other and the idlers may then be moved out of engagement with the friction wheels as in the form illustrated in Fig. 1.

Having thus described my invention, I claim as new and desire to secure by Letters Patent:

1. In combination, two oppositely-disposed rotatable disks, a friction wheel intermediate said disks and in engagement with the surface of each and movable along said surfaces to vary the relative speeds of rotation of said disks and said wheel, and means for applying fluid pressure to both of said disks to hold them in engagement with said wheel with equal pressure and to eliminate side thrust upon the wheel.

2. In combination, a drive wheel, two oppositely-disposed idlers in engagement therewith and rotated in opposite directions thereby, a driven wheel in engagement with each, one of said wheels being axially movable to engage with different portions of the idlers to vary its speed of rotation, and means for applying equal fluid pressure to both of said idlers to neutralize side thrust upon said drive wheel and driven wheel.

3. In combination, a rotatable disk, a friction wheel in engagement with the surface thereof and movable along said surface to vary the relative speeds of rotation, and means for applying fluid pressure to hold said disk and wheel in uniform engagement.

4. In combination, a disk, a friction wheel in engagement with the surface thereof, a spindle carried by said disk and rotatable supporting the latter, and means for applying a fluid under pressure into engagement with the end of said spindle to hold the disk in uniform engagement with the friction wheel.

5. In combination, a disk, a friction wheel in engagement with the surface thereof, a spindle secured to said disk and serving as an axis of rotation, anti-friction bearings for said spindle, a piston upon the outer end thereof, and means for supplying oil under pressure against said piston for holding the disk in engagement with the friction wheel and for lubricating the bearings of said spindle.

6. In combination, a driving member, including two rotatable gears, means for varying the relative rates of rotation, a rotatable driven member including a pinion in engagement with both of said gears, whereby its speed of rotation is dependent upon the difference in the speeds of rotation of the gears and a clutch for locking together said driving and driven members when they are rotating in the same direction and at the same speed.

7. In combination, a driving member, including a pinion and an internal gear encircling the same, means for varying their relative rates of rotation and the direction of rotation of one of them and a driven member including a pinion in engagement with the first-mentioned pinion and the internal gear.

8. In combination, a driving member, including a pinion, an internal gear inclosing the same, means for varying the relative rates of rotation and varying the direction of rotation of one of them, and a driven member, including a pinion mounted to rotate on an axis parallel to the axis of rotation of the driven member and in engagement with the first-mentioned pinion and the gear teeth.

9. In combination, a driving member, including a shaft having a pinion adjacent the end thereof, a sleeve rotatably mounted upon the shaft, a casing carried by the sleeve and having an internal gear, means for rotating said sleeve from said shaft at different speeds and in different directions of rotation, and a driven member, including a driven shaft and a pinion carried thereby and rotatable on an axis parallel to the axis of rotation of said shaft and in engagement with said first-mentioned pinion and casing gear.

10. In combination, a pinion, means for positively rotating the same at a uniform speed, a casing inclosing the pinion and having an internal gear, means for rotating said casing and varying the speed of rotation, a driven shaft in alinement with said pinion and a pinion carried by said driven shaft within the casing and in engagement with the first-mentioned pinion and said internal gear, and means for locking together the casing and the driven shaft when the pinion and internal gear are rotating in the same direction at the same speed.

11. In combination, a shaft, a sleeve rotatably mounted thereon, a friction wheel carried by said shaft, a friction wheel carried by said sleeve, each of said wheels being held from rotation in respect to its respective shaft or sleeve, one of said wheels being of greater diameter than the other wheel, and a disk presenting two parallel surfaces concentric with each other, one of said friction wheels engaging with one of said surfaces and the other friction wheel engaging with the other surface, and one of said friction wheels being axially movable along the surface of the disk with which it is in engagement.

In testimony whereof I have signed my name to this specification in the presence of two subscribing witnesses.

NORMAN RULAND.

Witnesses:
FLORENCE R. SACKETT,
CLARA SEDGWICK GOLD.